June 19, 1962     L. PON     3,039,736

SECONDARY FLOW CONTROL IN FLUID DEFLECTING PASSAGES

Original Filed Aug. 30, 1954

INVENTOR
Lemuel PON

BY

ATTORNEYS

United States Patent Office 3,039,736
Patented June 19, 1962

3,039,736
SECONDARY FLOW CONTROL IN FLUID
DEFLECTING PASSAGES
Lemuel Pon, 3330 Goyer St., Montreal, Quebec, Canada
Original application Aug. 30, 1954, Ser. No. 452,892, now Patent No. 2,888,803, dated June 2, 1959. Divided and this application Dec. 22, 1958, Ser. No. 782,178
1 Claim. (Cl. 253—39)

This application is a division of Serial No. 452,892, filed August 30, 1954 and now Patent No. 2,888,803 granted June 2, 1959.

This invention relates to fluid deflecting passages such as the rotor passages and stator passages of turbomachines, flow straightening cascade passages, cascade passages at bends in ducts, and the like, wherein the direction of fluid flow entering a passage is deflected, on passing through the passage, to leave in another direction relative to the passage; and has as one of its objects to increase the efficiency of fluid deflecting passages by suppressing the passage secondary flows and attenuating the strength of the passage vortices.

Another object of the invention is to make possible the use of greater deflection angles in fluid deflecting passages without excessive losses.

A further object of the invention is to provide conditions for the practical application of techniques of boundary layer removal from fluid deflecting blades or vanes.

Further features of the invention will become apparent from the following description of an embodiment thereof, illustrated in the accompanying drawings, wherein.

Figure 1:
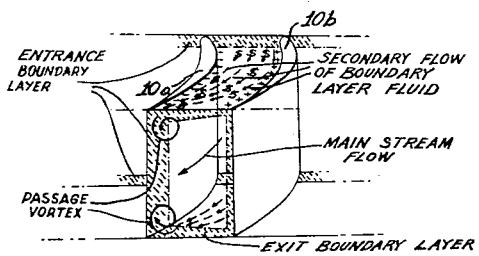
FIGURE 1 is a schematic diagram of the boundary layer secondary flow and vortex formation in a conventional fluid deflecting passage, one of a cascade.

In a fluid deflecting passage, such as formed in a cascade between two adjacent cambered blades and their shroud surfaces, which is illustrated in FIGURE 1 by the blades 10a and 10b with their shroud surfaces represented by phantom lines to expose the fluid flow within the passage, the fluid dynamics of the flow through the passage produces a positive pressure on the concave side of the passage, shown by positive signs, +, along the surface of blade 10b, and a negative pressure on the convex side of the passage, shown by negative signs, —, along the surface of blade 10a, that is a pressure gradient is created in the passage between the two blades. Now in the flow of a real fluid over confining surfaces, a boundary layer is formed between the surface and the main stream flow, the boundary layer being a layer of fluid having a velocity gradient through its thickness which varies from zero at the surface to the main stream value at the boundary layer edge adjacent to the main stream. Thus, in the boundary layer, stratas of fluid having varying amounts of momentum exist, with the fluid next to the surface having the least momentum and subsequent layers extending outwards having increasing momentum. On superimposing the pressure gradient existing in the passage between the two blades 10a and 10b, the boundary layers of non uniform momentum on the two shroud surfaces of the passage are turned to varying degrees, with the fluid of lower momentum turned through a greater angle than the fluid of greater momentum. This results in the secondary flow of the boundary layer fluid on the shroud surfaces towards the low pressure surface of the passage, that is towards blade 10a as illustrated by the vectors S in FIGURE 1. The boundary layer fluid on the positive pressure surface of blade 10b then tends to move onto the shroud surfaces. This flow pattern results in the accumulation of low momentum fluid on the low pressure surface, and in the formation of the passage vortices. All these effects reduce the efficiency of the passage to deflect the fluid flow through the desired angle. These secondary flow effects tend to increase in severity with increasing deflection angles and thus limit the maximum deflection angles obtainable. Secondary flows in fluid deflecting passages also hinder the effectiveness of applying boundary layer removal techniques to the fluid deflecting blades for the purpose of improving their efficiency and increasing the maximum possible deflection angles. The application of boundary layer suction on the fluid deflecting blades serves to increase the secondary flows and their associated losses which largely cancels out the hoped for improvements.

Figure 2:
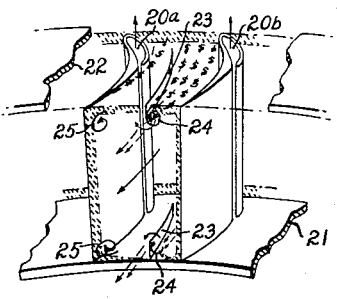
FIGURE 2 is a diagrammatic view of the action of secondary flow fences installed in a fluid deflecting passage to block or substantially reduce the secondary flow of boundary layer fluid to the low pressure surface of the passage.

In the present invention, secondary flow losses are largely reduced by inserting one or more secondary flow control fences on each shroud surface of a fluid deflecting passage to block the secondary flow of boundary layer fluid towards the low pressure surface of a passage. This is illustrated in FIGURE 2. In the fluid deflecting passage formed between the blades 20a and 20b and the shroud surfaces 21 and 22, the flow of the boundary layer fluid on the shroud surfaces is forced to follow the secondary flow control fences 23, projecting from the shroud surfaces, or spill into and be entrained in the main stream flow. The vortices 24 that may be formed at the fences 23 may be suppressed by slightly angling the fences 23 to the main stream flow direction so as to tend to generate a vortex in the opposite direction to that generated in the secondary flows. By the use of the secondary flow control fences 23, the accumulation of low momentum fluid on the low pressure surface of the fluid deflecting passage is greatly reduced and the size and strength of the passage vortices 25 are reduced with attendant reduction of the secondary flow losses.

Figure 3:
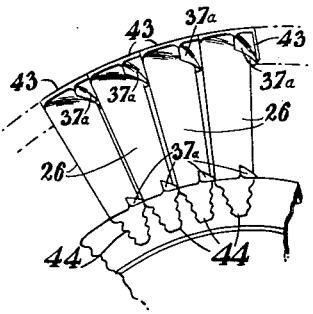
FIGURE 3 is a fragmentary perspective view of a rotor blade row, showing the application of boundary layer secondary flow fences to rotor blade passages.

FIGURE 3 illustrates the use of secondary flow control fences, according to the invention, as applied to rotor passages of turbomachines. In the example illustrated, the rotor blades 26 are of the shrouded type. Secondary flow control fences 37a are attached to the rotor blade shroud plates 43 and to the surface of the rotor blade hub 44 as shown. The fences 37a project into the passages to a height approximately equal to the thickness of the boundary layer formed on the surfaces to which the said fences are attached. The projected height of the fences 37a may increase along its chord length as the accumulating boundary layer fluid grows in thickness along the said fences. The camber line of the fences 37a approximately coincide with the streamline of the local main stream flow adjacent to the fence location.

Figure 4:
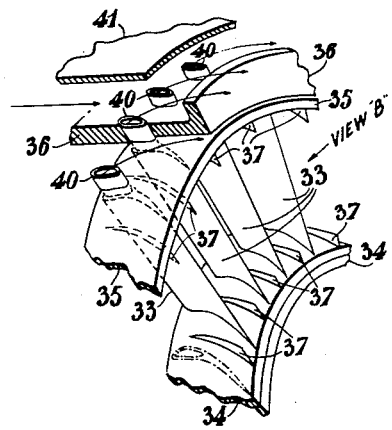
FIGURE 4 is a fragmentary perspective view of a stator blade row showing the application of boundary layer secondary flow fences in combination with a technique for boundary layer removal from the stator blade.
Figure 5:
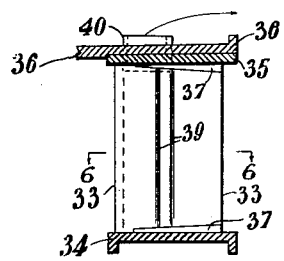
FIGURE 5 is an end view of FIGURE 4 seen from view "B," showing a stator blade and secondary flow fences.
Figure 6:
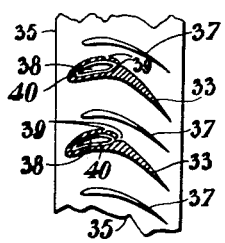
FIGURE 6 is a sectional view taken along line 6—6 of FIGURE 5.

FIGURES 4 to 6 inclusive, illustrate the use of secondary flow control fences in combination with a technique for boundary layer removal from the fluid deflecting blades as applied to stator passages of turbomachines. As shown in FIGURES 4 to 6 inclusive, the stator blades 33 are set between the inner shroud 34 and the outer shroud 35. In each stator passage between two adjacent stator blades, on both inner and outer shrouds, one or more secondary flow control fences 37 are attached to block or substantially reduce the secondary flow of boundary layer fluid to the low pressure surface of the passages. The camber line of the fences 37 approximately coinciding with the streamline of the local stream flow adjacent to the fence location. The fences 37 project into the passages to a height approximately equal to the local boundary layer thickness, the projected height increasing with distance downstream along the chord length of the said fences at a rate approximately sufficient to contain the progressive accumulation of the boundary layer fluid along the said fences. In combination with the fences 37, the boundary layer fluid on the low pressure surface of the blades 33 is drawn into the hollow passages 38 within the blades 33 through spanwise slots 39 suitably located on the low pressure surface of the blades 33. The hollow passages 38 communicate with the atmosphere outside the casing 36 through the short open ended tubular inserts 40. The blade boundary layer fluid is made to flow into the hollow passages 38 through the slots 39 and then out through the tubular inserts 40, by the pressure differential between the openings 39 and the atmosphere outside the casing 36. The bled off boundary layer fluid is collected in the spacing between the casing 36 and the shroud cone 41 and ejected by an ejector nozzle (not shown).

What I claim is:

In turbo-machines having fluid deflecting passages formed between two adjacent blades cambered in the same sense and their shroud surfaces; in combination, means for at least substantially reducing the secondary flow of boundary layer fluid therein and means for removing the boundary layer fluid from the low pressure surface of the said cambered blades, said first means comprising at least one fence projecting from the surface of each shroud of each fluid deflecting passage, said fences having their camber lines approximately coinciding with the streamline of the local main stream flow adjacent the fence location and with the leading edge of said fences projecting into the passage to a height approximately equal to the local boundary layer thickness, the projected height of the fences increasing with distance downstream along the chord at a rate approximately sufficient to contain the progressive accumulation of boundary layer fluid along the fences.

References Cited in the file of this patent

UNITED STATES PATENTS

| | | |
|---|---|---|
| 2,406,499 | Jandasek | Aug. 27, 1946 |
| 2,558,816 | Bruynes | July 3, 1951 |
| 2,597,510 | McBride | May 20, 1952 |
| 2,650,752 | Hoadley | Sept. 1, 1953 |
| 2,749,027 | Stalker | June 5, 1956 |
| 2,844,001 | Alford | July 22, 1958 |
| 2,920,864 | Lee | Jan. 12, 1960 |